United States Patent [19]

Rebucci

[11] 4,150,701
[45] Apr. 24, 1979

[54] APPARATUS FOR FEEDING GRANULAR MATERIAL

[75] Inventor: Eugene L. Rebucci, Mt. Lakes, N.J.

[73] Assignee: Merrick Scale Mfg. Company, Passaic, N.J.

[21] Appl. No.: 870,959

[22] Filed: Jan. 19, 1978

[51] Int. Cl.² .............................................. B65B 3/04
[52] U.S. Cl. .................................. 141/232; 141/284; 202/263; 414/304
[58] Field of Search ............................. 141/231-233, 141/250-284; 202/262, 263, 269; 214/17 A, 17 B, 17 D

[56] References Cited

U.S. PATENT DOCUMENTS 3,764,026  10/1973  Olah ..................................... 141/232
4,074,816  2/1978   Legille .................................. 214/2

FOREIGN PATENT DOCUMENTS 1138245  1/1957  France ..................................... 202/263

Primary Examiner—Houston S. Bell
Attorney, Agent, or Firm—Seidel, Gonda, Goldhammer & Panitch

[57] ABSTRACT

A volumetric feeder is supported for movement between an operative position and an maintenance position. The feeder includes a housing having a rotatable blade means adjacent its lower end for feeding granular material from the housing. The blade means is driven by a motor disposed within the housing and enclosed within a shell. Conduit means is provided for supplying cooling air to the motor within said shell.

10 Claims, 3 Drawing Figures

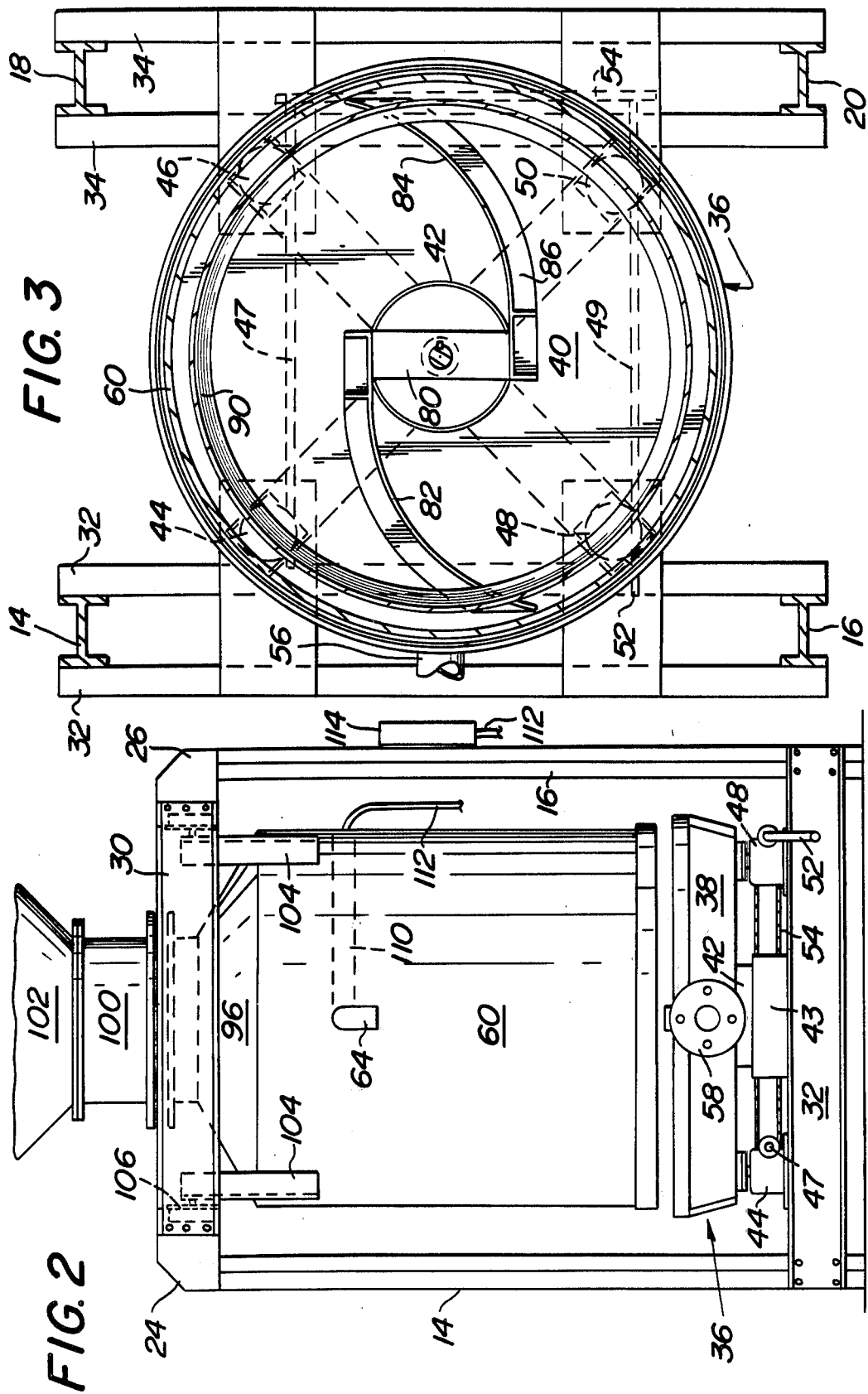

APPARATUS FOR FEEDING GRANULAR MATERIAL

BACKGROUND

There is a need for a volumetric feeder capable of feeding up to 300 tons per hour of granular material in the form of coal, rock, limestone, etc. from a hopper to consumption apparatus such a coal-fed power plant. The feeder must be capable of operating in an environment which is at an elevated temperature and dirty for long periods of time with minimum maintenance and with all components being readily accessible for maintenance. Commercially available feeders are not readily adaptable for such purpose and/or do not meet the specifications required.

SUMMARY OF THE INVENTION

The apparatus of the present invention includes a housing having an inlet adjacent an upper end thereof and an outlet adjacent a lower end thereof. A blade is rotatably mounted adjacent the lower end of said housing and is curved in the direction of rotation for moving flowable material within said housing radially inwardly to said outlet. A shell is supported in said housing above the elevation of said blade. A motor in said shell is connected to said blade for rotating said blade. An inlet conduit means extends from outside said housing to said shell for supplying cooling air to said motor. An outlet conduit means extends from outside said housing to said shell for venting air from said shell.

The shell is spaced radially inwardly from the inner periphery of said housing to define an annular flow path from said housing inlet to said housing outlet. The housing is supported for movement between an operative position and another position spaced from the operative position.

In a preferred embodiment of the invention, movement between the operative position and a maintenance position is attained by suspending the housing from above by way of wheels and a track means on which the wheels ride. When the housing is moved from its operative position, it will be in a position which facilitates access to the blade and its motor for purposes of maintenance.

It is an object of the present invention to provide a novel apparatus for feeding granular material.

Other objects will appear hereinafter.

For the purpose of illustrating the invention, there is shown in the drawings a form which is presently preferred; it being understood, however, that this invention is not limited to the precise arrangements and instrumentalities shown.

FIG. 2 is a side elevation view taken along the line 2—2 in FIG. 1 but after the base assembly has been lowered by jacks.

FIG. 3 is a sectional view taken along the line 3—3 in FIG. 1.

Referring to the drawings in detail, wherein like numerals indicate like elements, there is shown in FIG. 1 apparatus in accordance with the present invention designated generally as 10.

Figure 1:
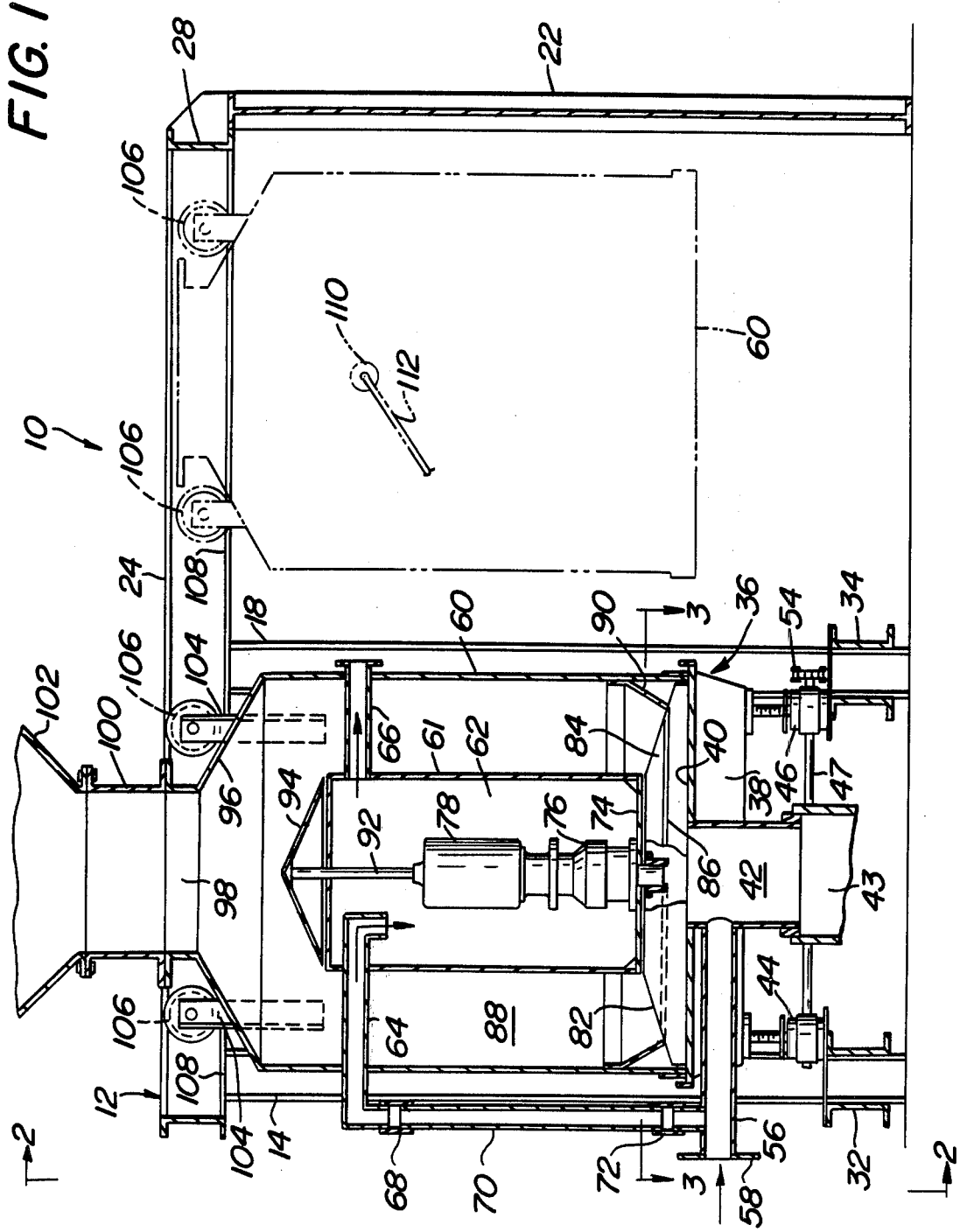
FIG. 1 is a vertical sectional view of apparatus in accordance with the present invention.

The apparatus 10 includes a support structure designated generally as 12. The support structure 12 includes a first set of posts 14, 16; a second set of posts designated 18, 20; and a post 22. The posts as disclosed herein are I beams but may be of other configuration. A top rail 24 is connected to the upper end of posts 14, 18. A top rail 26 is connected to the upper end of posts 16, 20. The top rails are parallel to one another and at the same elevation. At one end, the rails 24, 26 are interconnected by an upper cross rail 28. At their other end, the rails 24, 26 are interconnected by an upper cross rail 30. Cross rail 28 is supported by the post 22 intermediate its ends.

Referring to FIGS. 1 and 3, a pair of lower cross rails 32 interconnect the posts 14 and 16. A pair of lower cross rails 34 interconnect the posts 18 and 20. The cross rails 32, 34 are preferably channel-shaped as shown more clearly in FIG. 1. The cross rails 32, 34 support a base assembly designated generally as 36.

The base assembly 36 includes a base 38 which is generally X-shaped as shown more clearly in FIG. 3. A circular platform 40 is secured to the upper surface of base 38. Platform 40 is provided with a central hole from which depends a discharge conduit 42. Conduit 42 is coaxial with or otherwise arranged to deliver granular material to a feeder conduit 43 at the upper end of a pulverizer (not shown) of a coal-fed power plant.

The base assembly 36 is supported for movement in a vertical direction by way of a plurality of jacks 44, 46, 48 and 50. Jacks 44 and 46 are interconnected by rod 47. Jacks 48 and 50 are interconnected by rod 49. Crank handle 52 is connected to one of the rods such as rod 49. Rods 47 and 49 are interconnected by sprockets and chain 54. Hence, rotation of crank handle 52 will cause the base assembly 36 to elevate or descend depending on the direction of rotation of crank handle 52.

An air supply conduit 56 has a flange 58 on one end for connecting the conduit to a supply of air under pressure. The other end of conduit 56 communicates with conduit 42. Conduit 56 is radially disposed with respect to the platform 40. A cylindrical housing 60 is supported by platform 40 and is concentric therewith. Housing 60 is bottomless and preferably is constructed of ½ inch plate so as to meet NFPA code 60 and thereby can withstand pressures up to 50 psi from any coal dust explosion.

A sealed stationary shell 61 is disposed within the housing 60. As shown, shell 61 is cylindrical. If desired, shell 61 may be conical. The chamber 62 within shell 61 communicates with the exterior of the housing 60 by way of conduit 64 and conduit 66. Conduit 64 is an air supply conduit for cooling the chamber 62. Conduit 66 is a vent conduit. Shell 61 is supported within the housing 60 by said conduits 64, 66 and is concentric with housing 60. A removable coupling 68 interconnects one end of conduit 64 with one end of conduit 70. The other end of conduit 70 is connected to conduit 56 by a removable coupling 72.

The bottom wall 74 of the shell 61 is secured thereto by a plurality of fasteners. Floor 74 supports a speed reducer 76 and motor 78. The output from reducer 76 extends through a hole in floor 74 and is connected to the hub 80 from which extends a pair of blades 82, 84. See FIG. 3. Each of the blades 82, 84 are curved in the direction of rotation. Each of the blades is upright and has a stiffening rib 86 equidistant from its upper and lower edges. See FIG. 1. Each of the blades tapers towards its tip. Each of the blades at its inner end is approximately tangent to the discharge conduit 42. If desired, motor 78 may have a shaft at each end whereby shaft 92 extends upwardly through the roof of shell 61 to a rotatably spinner 94 which prevents granular material from accumulating on top of the shell 61.

The inner periphery of housing 60 and outer periphery of shell 61 define an annular flow passage 88 from the inlet end of the housing 60 to the blades 82, 84. At its inlet end, the housing 60 is provided with a frustroconical section 96 connected to a cylindrical section 98. Section 98 terminates in a radially outwardly directed flange to facilitate bolting the same to a cylindrical section 100 on the lower end of a hopper 102. Section 100 may be provided with a gate valve or the like. Section 98 is preferably a large diameter such as 2 feet or more to provide for free flow of coal which may have large chunks of ice therein.

As shown in FIG. 1, the housing 60 is supported by the base assembly 36 which in turn is supported in an elevated operative position by the jacks 44, 46, 48 and 50. Housing 60 is provided with a plurality of brackets 104, preferably four in number. Each bracket supports a wheel 106. In the elevated position of the base assembly 36, the wheels 106 are inoperative. To lower housing 60, bolts joining sections 98 and 100 are removed. When the jacks 44, 46, 48 and 50 are adjusted from their elevated position shown in FIG. 1 to a lower position as shown in FIG. 2, the housing 60 descends until the wheels 104 are supported by a rail 108 on each of the top rails 24, 26. Further downward movement of the base assembly 36 causes a separation between the housing 60 and base assembly 36 as shown in FIG. 2. Thereafter, housing 60 may be pushed to the phantom position shown in FIG. 1 to facilitate access to the components therewithin. Thus, when the housing 60 is in the phantom position shown in FIG. 1, access may be had to the motor 78, blades 82, 84, etc. for purposes of maintenance. Before shifting the housing 60 from the solid line position to the phantom position in FIG. 1, conduit 70 is disconnected at couplings 68, 72. See FIG. 2.

A conduit 110 extends from the exterior of housing 60 to the shell 61 and helps to support the shell 61. Conduit 110 is generally perpendicular to conduits 64, 66. Conduit 110 acts as a wire-way.

A cable 112 extends from the motor 78 through the conduit 110 to a junction box 114 on the post 16. Between conduit 110 and junction box 114, the cable 112 has sufficient length so that it does not require disconnection in each of the solid line and phantom positions of housing 60 in FIG. 1. Thus, motor 78 remains connected to power when the housing 60 is in the maintenance position.

The taper on the blades 82, 84 promotes even flow. The inwardly tapered skirt 90 cooperates with the taper on the blades to remove the head pressure of the granular material within the annular passageway 88. The provision of the motor 78 within the shell 61 provides for direct drive to the blades. Conduits 64 and 66 provide cooling air for cooling the motor 78 and also provide for pressurization of shell 61 to maintain the interior thereof dust-free.

In an operative embodiment of the present invention, housing 60 has an outer diameter of 4 feet. Motor 78 is a ½ horsepower DC motor. The speed reducer 76 has a high reduction ratio such as 200:1.

When feeding coal, conduit 42 discharges the coal to an air swept pulverizing mill using preheated air which usually has a temperature of about 250° F. The pulverized coal is blown from the mill directly into the furnace. Air at room temperature and at a pressure greater than that of the pulverizer is introduced into conduit 42 by conduit 56 to act as a seal to keep hot air from the furnace and/or mill out of housing 60 where such hot air could induce spontaneous combustion.

The feeder disclosed herein provides exceptional volumetric feeding accuracy which is becoming increasingly important for coal blending applications to meet air quality standards. Also, the feeder exhibits exceptional rangeability on the order of twenty to one and more. This results from the action of the shell 61, 94 which stabilizes the material flow characteristics allowing blades 82, 84 to function with equal effectiveness over a wide range of speeds.

In view of the above description and the accompanying drawings, as well as the state of the art, a detailed description of operation is not deemed necessary.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for feeding granular material comprising a housing having an inlet at its upper end and an outlet at its lower end, a blade means rotatably mounted adjacent said lower end of said housing, said blade means including at least one blade curved in the direction of rotation for moving flowable material radially inwardly to said outlet, a shell supported in said housing above the elevation of said blade, a motor in said shell, said motor being connected to said blade for rotating said blade, an air inlet conduit means extending from outside said housing to said enclosure for supplying cooling air to said motor, an outlet conduit means extending from outside said housing to said enclosure for venting air from said enclosure, said enclosure being spaced inwardly from the inner periphery of said housing to define an annular flow path from said housing inlet to said housing outlet, and means supporting said housing in a manner so that the housing may be moved between an operative position and another position spaced laterally from said operative position.

2. Apparatus in accordance with claim 1 wherein said supporting means includes rail means for supporting wheels on said housing, the rail means being horizontally disposed so that the housing may move horizontally between said positions.

3. Apparatus in accordance with claim 2 including means for supporting said housing from below and for elevating said housing so that the wheel means is out of contact with said rail means when said housing in its operative position.

4. Apparatus in accordance with claim 1 wherein said housing is bottomless, a base assembly closing the bottom of said housing and supporting said housing from below, and means for facilitating separation of said housing and base assembly for access to said blade and motor.

5. Apparatus in accordance with claim 1 wherein the upper edge of said blade is tapered toward the tip thereof, means at the lower end of said housing for causing granular material in said annular passageway to flow radially inwardly toward the tapered edge of said blade.

6. Apparatus in accordance with claim 1 wherein said supporting means for said housing includes a base assembly, said base assembly being supported by a plurality of jacks, means for operating said jacks simultaneously to separate the base assembly from said housing.

7. Apparatus for feeding granular material comprising:
 a. a housing having an inlet adjacent its upper end, said housing having an outlet adjacent its lower end,
 b. a support structure for supporting said housing in each of an operative position and a maintenance position, said support structure having track means for cooperation with wheels connected to said housing to facilitate movement of said housing horizontally between said positions,
 c. an enclosure supported within said housing above the elevation of said housing outlet and adjacent thereto, a motor in said enclosure, the outer periphery and said enclosure and the inner periphery of said housing defining an annular flow passage, and
 d. blade means located between the lower end of said enclosure and said outlet, said blade means being connected to said motor, said blade means being arranged to move granular material radially inwardly from said flow passage to said outlet, at least a portion of the upper edge of said blade means tapering downwardly toward the lower edge of said blade means adjacent the outer end of said blade means.

8. Apparatus in accordance with claim 7 including means definining a flow passage for cooling air from outside said housing to said enclosure for cooling said motor and pressurizing the interior of said enclosure.

9. Apparatus in accordance with claim 8 wherein said enclosure is supported within said housing by conduits which at least in part define said flow passage for cooling air.

10. Apparatus in accordance with claim 7 wherein said housing is provided with a base assembly, said base assembly being mounted on said support structure below the elevation of said housing, said base assembly including a platform, said housing being bottomless with its open bottom being closed by said platform, means for moving said platform in a vertical direction with respect to said housing.

* * * * *